United States Patent [19]

Nakayama et al.

[11] Patent Number: 5,110,792

[45] Date of Patent: May 5, 1992

[54] METHOD AND APPARATUS OF OPTICAL MODULATION USING SUPERCONDUCTIVE OXIDE MATERIAL

[75] Inventors: Takahiro Nakayama, Hitachi; Kunihiro Tamahashi, Mito; Moriaki Fuyama, Hitachi; Hiroyuki Minemura, Hitachi; Yoshio Sato, Hitachi; Nobuyoshi Tsuboi, Ibaraki; Hiroaki Koyanagi, Katsuta, all of Japan

[73] Assignee: Hitachi, Ltd., Tokyo, Japan

[21] Appl. No.: 431,231

[22] Filed: Nov. 3, 1989

Related U.S. Application Data

[63] Continuation-in-part of Ser. No. 197,965, May 24, 1988, abandoned.

[30] Foreign Application Priority Data

| May 25, 1987 | [JP] | Japan | 62-125868 |
| May 25, 1987 | [JP] | Japan | 62-125869 |
| Jun. 24, 1987 | [JP] | Japan | 62-155462 |
| Jun. 24, 1987 | [JP] | Japan | 62-155463 |

[51] Int. Cl.$^5$ ............. H01B 12/00; G02F 1/01; G01K 7/00; H01P 1/11
[52] U.S. Cl. .................. 505/1; 359/240; 359/245; 359/252; 505/848; 505/828; 505/702
[58] Field of Search ............ 350/355; 505/1, 828, 505/848, 849, 851, 702; 357/5; 359/245, 252, 240

[56] References Cited

U.S. PATENT DOCUMENTS

| 2,914,736 | 11/1959 | Young | 505/828 |
| 3,193,685 | 7/1965 | Burstein | 505/848 |
| 3,691,381 | 9/1972 | Kleppner | 505/848 |
| 3,995,278 | 11/1976 | Young | 505/848 |
| 4,521,682 | 6/1985 | Murakami et al. | 505/848 |
| 4,563,093 | 10/1986 | Tada et al. | 356/368 |
| 5,026,682 | 6/1991 | Clark et al. | 505/702 |

FOREIGN PATENT DOCUMENTS

| 0688748 | 6/1964 | Canada | 505/848 |
| 3326555 | 2/1984 | Fed. Rep. of Germany . |
| 3510704 | 9/1986 | Fed. Rep. of Germany . |
| 2170018 | 7/1986 | United Kingdom . |

OTHER PUBLICATIONS

"Meisner Effect"; McGraw-Hill Encyclopedia of Science and Technology, vol. 10, p. 578.
Komuro et al., "Structures and Superconducting Properties of Y–Ba–Cu–O Sputtered Films", J. Journal of App. Phys. (1987), pp. L1907–1909.
Lexikon der Physik, H. Franke, Hrsq., 3, Aufl, Bd. 3, Stuttgart 1969, S. 1649–1650.
elektrotechnik, 65, H. 7, 7. Apr. 1983, S. 24–27.
Franz Eder, Arbeitsmethoden der Thermodynamik, Bd. I, Temperaturmessung, Heidelberg 1981, S. 385–389.

*Primary Examiner*—Eugene R. Laroche
*Assistant Examiner*—Evelyn A. Lester
*Attorney, Agent, or Firm*—Antonelli, Terry, Stout & Kraus

[57] ABSTRACT

An optical modulation method and apparatus uses superconductive oxide material for the optical modulation element. The current, magnetic field, temperature or pressure applied to the superconductive oxide material is varied so as to induce a superconduction-normalconduction transition, and the resulting variation in optical characteristics such as the reflectivity, transmissivity or refractive index of the superconductive oxide material modulate the input light. The method and apparatus are fast in operation and simple in structure. The method and apparatus also detect the variation in the current, magnetic field, temperature or pressure as a change in the reflectivity, transmissivity or refractive index of the superconductive oxide material on the basis of a superconduction-normalconduction transition.

34 Claims, 13 Drawing Sheets

SUPERCONDUCTION STATE

NORMALCONDUCTION STATE

METHOD AND APPARATUS OF OPTICAL MODULATION USING SUPERCONDUCTIVE OXIDE MATERIAL

CROSS-REFERENCE TO RELATED APPLICATION

This is a continuation-in-part application of U.S. Patent application Ser. No. 197,965 filed on May 24, 1988.

BACKGROUND OF THE INVENTION

This invention relates to a method and an apparatus of optical modulation using superconductive oxide material, and particularly to a method and apparatus of optical modulation useful for various optical recording heads, optical shutters and optical switches which perform light path switching or light intensity modulation.

The invention also relates to a method of detecting an external physical state such as the current, magnetic field, temperature, pressure, etc. by utilization of superconductive material, and particularly to a method of detecting an external physical state useful for various sensors and readers operating in binary (0 or 1) mode.

Optical switches and optical modulators are described, for example, in publication "Optronics", 1987, No. 4, pp. 70–75. As prior art of optical shutters, the shutter using liquid-crystal is known, as described in pp. 97–103 of the above publication. A variety of materials for optical sensors have been proposed, as described, for example, in publication "Optronics", 1983, No. 7, pp. 36–43. These publications, however, give no suggestion of using superconductive material for the optical modulation method or device.

Recently, the optical communication system using optical fiber has been put into practice by being supported by the advanced development of the optical system made up primarily of the light source, optical path and optical receiver. In addition to the above fundamental system components, there is an intense demand of developing optical switches and modulation devices for realizing a higher grade optical system.

The optical switch is used for switching in the event of failure in the optical transmission path or optical reception device, and also will be used for optical switching. Optical switches fall into categories including: (1) mechanical system, (2) optoelectric system, (3) opto-acoustic system, (4) optomagnetic system, (5) opto-thermal system, and (6) molecular orientation system.

A conceivable optical switch includes several ports formed in a PLZT waveguide layer and operates to switch the light path by utilization of a change in refractive index of PLZT in response to voltage application, as described for example in the Technical Study Report of The Institute of Electronics and Communication Engineers of Japan, OQE 84-16, pp. 57–, 1984.

Various optical modulation devices of a traveling wave type using a $LiNbO_3$ waveguide have been studied, as described, for example, in the publication of The Institute of Electronics and Communication Engineers of Japan, Vol. 69 (1986), pp. 141–.

The above-mentioned prior art optical devices utilize a change in refractive index of the material based on the opto-electric phenomena. The refractive index change is as small as 1% or less and therefore it is merely applicable to light path switching for the light propagated in the waveguide.

SUMMARY OF THE INVENTION

An object of this invention is to provide a method and apparatus of optical modulation using superconductive oxide material which has not been considered in the field of optical devices in the past. Application of superconductive material to optical devices, based on this invention, improves their response speed, permits the device to operate even without a waveguide (although a waveguide can be used), and simplifies the device structure.

Another object of this invention is to provide a method of easily detecting an external physical state, such as the electric current, magnetic field, temperature or pressure, by utilization of superconductive oxide material Namely, the former object is the optical modulation in response to an external input signal such as the current or magnetic field, while the latter object is the detection of an external physical state such as the current and magnetic field through the measurement of the modulated light.

The above objectives are realized by placing a superconductive material midway in the light path. When the magnitude of current or magnetic field or the temperature or pressure applied to the superconductive material varies to induce a superconduction-normalcondution transition, optical characteristics, such as transmissivity, reflectivity or refractive index, of the material vary. The variation of optical characteristics provides different light outputs for a constant light input. As superconductive material, superconductive oxide materials which can have a higher critical temperature are preferably used.

FIG. 1 shows the boundaries of the superconduction state and normalconduction state of superconductive material in terms of the temperature, magnetic field and current. The space enclosed by the coordinate planes and the hatched curving surface is superconduction state 1, while the exterial space is normalconduction state 2. It means that the superconduction state is turned to the normalconduction state by increasing any of the temperature, magnetic field and current. It is also possible to turn the superconduction state to the normalconduction state by application of pressure to the superconductive material so that its lattice is deformed, as shown in FIG. 2 depicting the relationship between the transition temperature and pressure applied to the superconductive oxide material. The transition based on the pressure difference have influences on the current and magnetic field, and the vertical axis of FIG. 2 can be replaced with any other axis of FIG. 1 in a qualitative sense. A superconductive material has its transmissivity, reflectivity and refractive index varied by the transition between superconduction and normalconduction as shown in FIGS. 5, 6 and 7. This enables the superconductive material to provide different light outputs for a constant light input depending on its conduction state.

A superconductive material exhibits the perfect electric conduction and perfect diamagnetism when it is cooled below the critical temperature Tc.

Superconductive materials suitable for carrying out this invention are those having the following properties: (1) Superconductivity at a room temperature (2) Great variation in the degree of interaction with the light in response to the transition. Among conventionally known materials, alloys such as NbTi and $Nb_3Sn$ have low Tc (<30° K.) and have electrical conductivity in the normalconduction state, and therefore the variation in the degree of interaction with the light is not so great. In contrast. superconductive, oxide materials represented by La-Ba-Cu-O (Tc≈30° K.) and Y-Ba-Cu-0 (Tc≈90° K. >77° K.) have high Tc and are insulative in the normalconduction state, and therefore the variation in the interaction with the light at a transition is great.

Therefore, it is a superconductive oxide material that is required in the present invention. Specifically, the material designated by the following molecular formulae is suitable for the superconductive oxide material in the present invention.

$(La_{1-x}Sr_x)CuO_4$, $(La_{1-x}Ca_x)CuO_4$, $(La_{1-x}Ba_x)_2CuO_4$, $La_1Ba_2Cu_3O_7$, $La_{2-x}Na_xCuO_4$, $La_{2-x}CuO_{4-y}$, $La_{2-Ba_y}LuC_6O_y$, $Y_1Ba_2Cu_3O_7$, $Y_2Ba_4Cu_8O_{20-x}$, $Y_2Ba_4Cu_7O_{15}$, $Bi_2Sr_2$, $Cu_1O_y$, $Bi_2Sr_2Ca_1Cu_2O_y$, $Bi_2Sr_2Ca_2Cu_3O_y$, $Bi_2Sr_2ca_yCu_4O_y$, $Ba(Pb_{1-x}Bi_x)O_3$, $(Ba_{1-x}K_x)BiO_3$, $(Bi_{1-x}Pb_x)_2Sr_2Ca_2Cu_3O_y$, $Bi_2Sr_{2.6}Nd_{0.4}Cu_2O_y$, $Tl_2Ba_2Ca_1Cu_2O_y$, $Tl_2Ba_2Ca_1Cu_2O_y$, $Tl_2Ba_2Ca_2Cu_3O_y$, $Tl_1Ba_2CuO_y$, $Tl_1Ba_2Ca_1Cu_2O_y$, $Tl_1Ba_2Ca_2Cu_3O_y$, $Tl_1Ba_2Ca_3Cu_4O_y$, $Tl_1Ba_2Ca_4Cu_5O_y$, $Tl_1Ba_3Ca_2Cu_4O_y$, $Tl_1Sr_2CaCu_3O_y$, $(Tl_{0.5})Sr_2Ca_2Cu_3O_y$, $(Tl_{1-x}K_x)_2Ba_2Ca_2Cu_3O_y$, $(Tl_{0.75}Bi_{0.25})_{1.33}(Sr_{0.5}Ca_{0.5}Ca_{0.5})_{2.7}Cu_2O$, $Nd_{1.6}Sr_{0.2}Ce_{0.2}CuO_4$, $Pb_2Sr_2Y_{0.5}Ca_{0.5}Cu_3O_8$ where x and y are $0 \leq x, y \leq 1$.

The above-mentioned superconductive oxide materials have different transition or critical temperatures in different compositions and different structures even if constituent elements of the materials are the same with each other. When $YBa_2Cu_3O_{7-\delta}(0<\delta<0.5)$ in a film consists of mono-structured crystals, a resistivity $\rho$ changes critically at a transition temperature Tc as shown in FIG. 3. That is to say, a phase changes digitally in the film. Hereinafter, such a superconductive material will be called a Type-A superconductive material.

On the other hand, when there exist a plurality of kinds of crystals in the film even if the average compositions of the film as a whole are the same, the resistivity $\rho$ changes continuously between some finite interval of temperatures $T_S$ and $T_E$ as shown in FIG. 4. That is to say, there exist in the film both a superconductive portion and a normalconductive portion when a temperature is between $T_S$ and $T_E$. Thus, transistion of the phase in the film as a whole advances with a finite interval of temperature ($T_S \sim T_E$). Hereinafter, such a superconductive material will be called a Type-B superconductive material.

FIG. 8 shows, as a model, the reflectivity of a type-B superconductive material relative to the applied magnetic field. The reflectivity varies continuously between the magnetic fields $H_{C1}$ and $H_{C2}$.

When the light is projected to a material in a superconductive state, it is reflected by the Meissner effect. When the material is turned to a normalconduction state by application of heat, current, magnetic field, and/or pressure, the Meissner's effect vanishes, causing the reflected light to decrease. By choosing the thickness of superconductive film properly, it is possible to set arbitrarily the variation of reflectivity or transmissivity of the film in the superconduction state and normalconduction state.

The variation in optical characteristics at the transition between the superconduction and normalconduction states is described in publication "Introduction to Solid Physics, Part 2", 5th edition, p. 348, by Charles Kitel, which describes that a very thin metallic film has its transmissivity increasing in the superconduction state. Another publication "Physical Review Letters", Vol. 59, No. 19, 1987, pp. 2220–2221, describes that the transmissivity of ceramics increases in the superconduction state. The same description as the above Physical Review Letters is found in Publication "Japanese Journal of Applied Physics", Vol. 26, No. 4, 1987, pp. 479–480.

In case of using a type-B superconductive material, the characteristics that the Meissner's continuous variation in the mixed state is in correspondence to the continuous variation of the optical characteristics is used. Namely, a type-B superconductive material in the mixed state includes both of the superconductive property (Meissner's property) and normalconductive property, and it can be varied continuously by application of a magnetic field. This means that the amount of reflected light can be varied continuously in the mixed state. By choosing the thickness of superconductive film properly, it is also possible to set arbitrarily the range of variation of reflected light or transmitted light, i.e., the dynamic range of modulation.

The principle of this invention applied to the optical switch will be described which reference to FIGS. 9 through 13. FIG. 9 shows the case where the light is incident on an optical switch in the superconduction state. The incident light 5 is reflected by the Meissner's effect of a superconductive film 3 as shown by 6. This is the off-state of the switch. FIG. 10 shows the operation of the optical switch in the normalconduction state. Since the Meissner's effect is absent, the incident light 5 passes through the optical switch. This is the on-state of the switch. The variation in reflectivity or transmissivity between the on-state and off-state can be changed depending on the thickness of superconductive film. The following example is the case of controlling the amount of transmitted light. The depth $\lambda_B$ of magnetic field penetrating into the superconductive material is expressed as follows.

$$\lambda_B = (m/e^2 \mu_o n_s)^{\frac{1}{2}} \qquad (1)$$

where m is the mass of electron, $-e$ is the charge of electron, $\mu_o$ is the permeability in the vacuum, and $n_s/2$ is the density of superconductive electron pairs. Since the light is an electromagnetic wave, the light penetration depth $\lambda_S$ in the superconduction state is virtually equal to the above magnetic field penetration depth $\lambda_B$, i.e., $\lambda_X = \lambda_B$. The following deals with the amount of transmitted light $T_{off}$ in the off-state, with the superconductive film having a thickness of d. When $d >> \lambda_S$, $T_{off}$ is 0. As d is made smaller progressively, the transmitted light begins to emerge at $d \approx \lambda_S$, and it becomes $T_{off} > 0$. When d is made further smaller, it becomes $T_{off} \approx 1$ when $d << \lambda_S$.

FIG. 11 shows the relation between $T_{off}$ and d. The superconductive film is in the normalconduction state in the on-state and the Meissner's effect is absent, and therefore the light penetration depth $\lambda_n$ in normalconduction results in $\lambda_n > \lambda_S$. FIG. 12 shows the relation between the film thickness d and the amount of transmitted light $T_{on}$. At this time, the light shut-out ratio $$\frac{T_{on} - T_{off}}{T_{on}}$$

is as shown in FIG. 13, having a maximum value at $d = d_0$. A greater light shut-out ratio is generally desirable for an optical switch, and the thickness of superconductive film is preferably set to $d_0$. For some application, a specific light shut-out ratio can be set by choosing the thickness of superconductive film. Setting the film thickness to be $0<d<d$ provides a greater $T_{on}$ as compared with the case of $d_o<d$, and the light source power can be reduced.

In contrast to the use of the transmitted light in the foregoing, the reflected light can also be used. In this case, by varying the incident angle so that the incident light and reflected light have separate optical axes, an optical switch using both the transmitted light and reflected light, without interference with each other, can be realized.

Practical optical switches, in many cases, use a waveguide layer and protection layer in combination, besides the film structure shown in FIGS. 9 and 10. Essential points of this invention are the use of the state transition between superconduction and normalconduction (presence or absence of Meissner's effect) of a superconductive material for an optical switch or the like, and the control of the light shutout ratio by varying the thickness of superconductive film which is chosen to be around the magnetic field penetration depth $\lambda_B$ ($\simeq \lambda_S < \lambda_n$) expressed by equation (1). Since a compact element can be realized without using a waveguide path, it is possible to perform switching for lights with different wavelengths. Since a superconductive material-based element operates fast, as represented by Josephson elements, the inventive optical switch has a high operating speed.

The principle of the optical modulation element using a type-B superconductive material is explained in the same way as above. A type-B superconductive material is in the Meissner state when the applied magnetic field H is $H<H_{C1}$ as shown in FIG. 8. Therefore, the incident light 5, which is an electromagnetic wave, cannot penetrate into the superconductive material 3, resulting in a maximum reflected light 6. This is the off-state. As the applied magnetic field H is increased to $H_{C1}<H<H_{C2}$, the superconductive material enters the mixed state and the incident light 5 begins to penetrate into it. The transmitted light 7 emerges, and the reflected light 6 diminishes progressively. When the applied magnetic field is further increased to $H_{C2}<H$, the superconductive material enters the normalconduction state, in which the Meissner property vanishes, and the reflected light 6 becomes minimum and the transmitted light 7 becomes maximum. This is the on-state. Using the continuous variation in the amount of transmitted light or reflected light between the on-state and off-state, the incident light is rendered amplitude modulation.

The inventive method of detecting the current, magnetic field, temperature, or pressure, by using superconductive material is an application of the aforementioned inventive method of optical modulation using superconductive material. It is readily determined through the observation of the transmitted light or reflected light as to which of the superconduction or normalconduction state the superconductive material resides, and it is possible to compare the temperature or external magnetic field of the space where the superconductive material is placed or the current or pressure applied to the superconductive material, with a respective reference value. Among the temperature, magnetic field, current and pressure, by varying three dependent variables other than the primary variable which is the object of detection, the setting level of the primary variable, at which the phase transition takes place, can be varied.

DESCRIPTION OF THE PREFERRED EMBODIMENTS

Embodiments of this invention will be described with reference to FIGS. 14 through 30.

Figure 14:
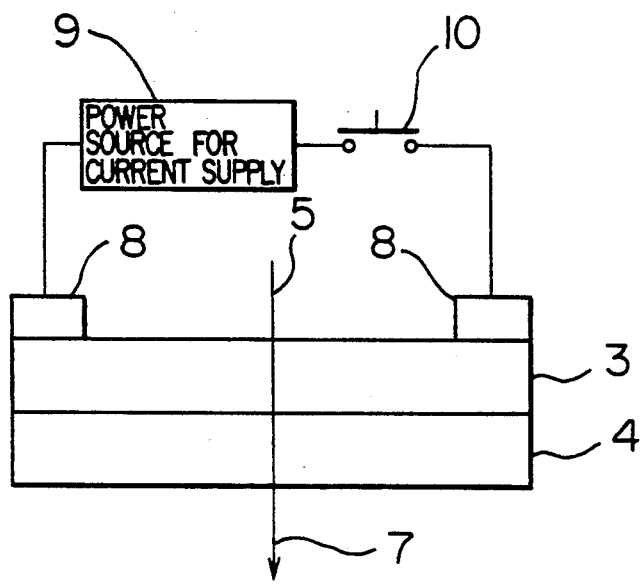
FIGS. 14 and 15 are diagrams showing embodiments of the optical switch which is operated by the current.

FIG. 14 shows, as an embodiment of this invention, the method of operating the optical switch by current. In the figure, indicated by 3 is a superconductive film, 4 is a substrate, 8 are junctions between the superconductive film and wires, 9 is a power source for current supply, and 10 is a switch. When the switch 10 is closed, a current I (I>Ic) flows in the superconductive film 3, causing it to enter the normalconduction state. When the switch 10 is opened, the current becomes I<Ic, and the superconductive film 3 returns to the superconduction state. The optical switch operates in this manner.

A $YBa_2Cu_3O_{7-\delta}$ ($0<\delta<0.5$) thin film was used to evaluate the optical switching characteristics. When a current of $10^4$ A/cm$^2$ was supplied at 77° K., transition to the normalconduction state occurred and the transmissivity increased from 5% to 12%. By optimizing the crystal formation, orientation and thickness of superconductive film, it is possible to improve the light shut-out ratio.

A method of forming a thin film utilized in the embodiment of the present invention is described in Japanese Journal of Applied Physics Vol. 26, No. 11, November 1987, pp. L1907–L1909.

Figure 15:
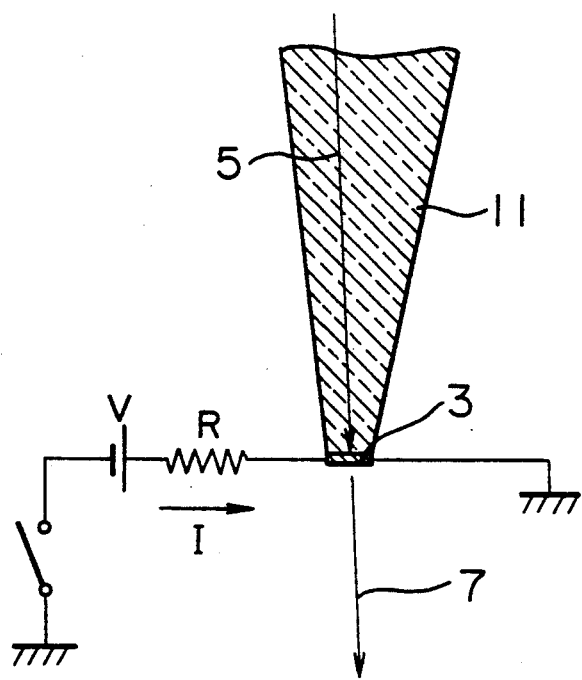

FIG. 15 shows, as in FIG. 14, the arrangement of conducting an incident light 5 through a superconductive film 3 to obtain a transmitted light (output light) 7. Indicated by 11 is a supporting member for the superconductive film. In this embodiment, the transition between superconduction and normalconduction is achieved by turning on or off a current I supplied to the superconductive film 3. The transmitted light 7 has its spectrum varied in correspondence to normalconduction or superconduction.

Figure 16:
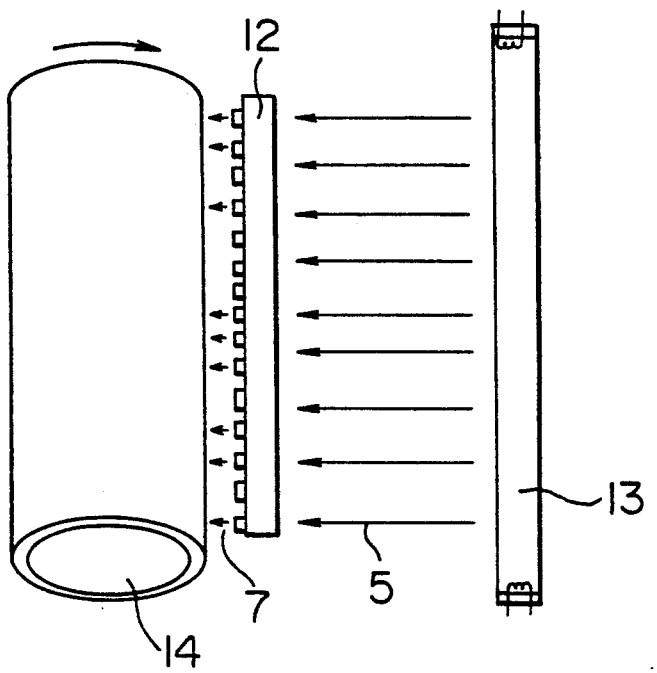
FIG. 16 is a diagram showing an embodiment of the optical printer which is an application of the embodiments shown in FIGS. 14 and 15.

FIG. 16 shows an optical switch array which employs the optical switch shown in FIG. 14 or 15. The arrangement includes the optical switches using superconductive films 12 shown in FIG. 14 or 15 aligning closely to form an array. The optical switch array 12 causes the input light 5 from the light source 13 to go in two directions, so that the charge distribution on the surface of the photosensitive drum 14 is controlled thereby to attract toner as intended. Application of this invention to the optical gate array, in place of the conventional liquid crystal array, improves the switching speed and also simplifies the structure.

Figure 17:
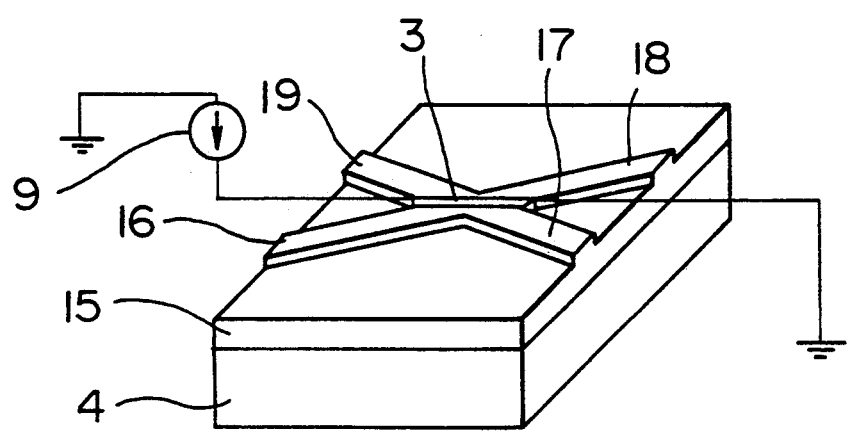
FIG. 17 is a diagram showing an embodiment of the light path switch which is an application of the optical switch operated by the current.

FIG. 17 shows the light path switch which is an application of the inventive optical switch. In the figure, indicated by 3 is a superconductive material, 4 is a substrate, 15 is a waveguide, 16-19 are ports, and 9 is a current source. The light entered from the A-port 16 into the optical switch is reflected to the B-port 17 when the superconductive material 3 is in the superconduction state, or it is transmitted to the C-port 18 when the superconductive material 3 is in the normalconduction state. A light path switch of a waveguide path type is thus realized.

A $YBa_2Cu_3O_{7-\delta}$ ($0<\delta<0.5$) thin film was used to evaluate the optical switching characteristics. On an Si substrate, an $SiO_2$ layer was formed to a thickness of 2 μm as a buffer layer. Over the buffer layer, a ridge type waveguide path and $YBa_2Cu_3O_{7-\delta}$ ($0<\delta<0.5$) layer were formed on MgO substrate. At 77° K., an He-Ne laser beam was entered through the A-port 16, and the light output at the C-port 18 was measured. At 77° K., the output at the C-port 18 was 0.05 mW when the current was absent. The light output increased to 0.15 mW when a current of $10^4$ A/cm$^2$ was supplied. By optimizing the crystal formation, orientation and thickness of the superconductive film and the intersecting angle of the waveguide paths, the switching characteristics can be improved.

Figure 18:
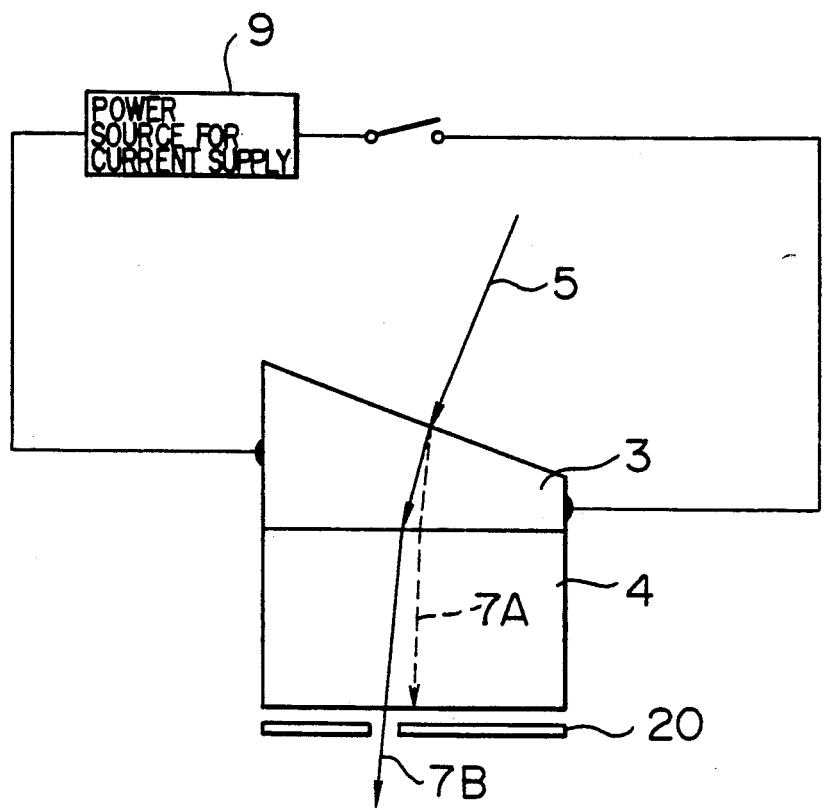
FIG. 18 is a diagram showing an embodiment of the optical switch which is operated by the current.

FIG. 18 shows the structure for varying the refractive index of a superconductive material by the normalconduction-superconduction transition thereby to switch the light. Indicated by 3 is a superconductive material and 4 is a substrate. A power source 9 is used to conduct or shut off the current so that the normalconduction-superconduction transition is induced in the material 3. As a result, the refractive index of the superconductive material 3 varies, and the output light derived from an incident light 5 has its path varied as shown by 7A in superconduction or 7B in normalconduction. A slit 20 is used to transmit the output light on one path, and the light is switched.

$YBa_2Cu_3O_{7-\delta}$ ($0<\delta<0.5$) was used for the superconductive material 3 and a laser beam with an 830 nm wavelength is entered as the incident light 5 to the material at 77° K. The material 3 has an edge angle of 43° and a thickness at the light transmission section of 50 nm. The substrate 4 is a sheet of quartz with a thickness of 1.1 mm. By turning on and off an average current density of $1\times10^4$ A/cm$^2$, the normalconduction-superconduction transition took place in the material 3. As a result, the device delivers the output light through the slit with a diameter of 110 nm when the current is on, or shuts off the light when the current is off.

Figure 19:
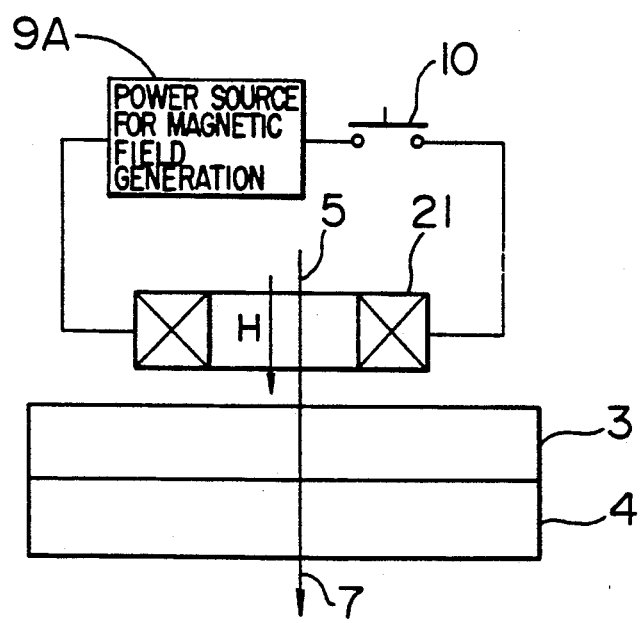
FIG. 19 is a diagram showing an embodiment of the optical switch which is operated by the magnetic field.

FIG. 19 shows an embodiment of the inventive method in which the optical switch is operated by the magnetic field. In FIG. 19, indicated by 3 is a superconductive film, 4 is a substrate, 21 is a magnetic field generator, 9A is a power source for magnetic field generation, 10 is a switch, 5 is an incident light, and 7 is a transmitted light. When the switch 10 is closed, a magnetic field H (H>Hc) is generated, and the superconductive film 3 enters the normalconduction state and transmits the incident light 5. When the switch 10 is opened, H becomes smaller than Hc, and the superconductive film 3 returns to the superconduction state and reflects the incident light 5.

Using a $YBa_2Cu_3O_{7-\delta}$ ($0<\delta<0.5$) thin film (thickness: 180 nm) with a current conduction of 10 A/cm$^2$ at 77° K., when an external magnetic field of 10 mT was applied, a transition from superconduction to normalconduction occurred, and the transmissivity increased from 4% to 12%. By optimizing the crystal formation, orientation and thickness of the superconductive film, the light shut-out ratio is improved.

Figure 20:
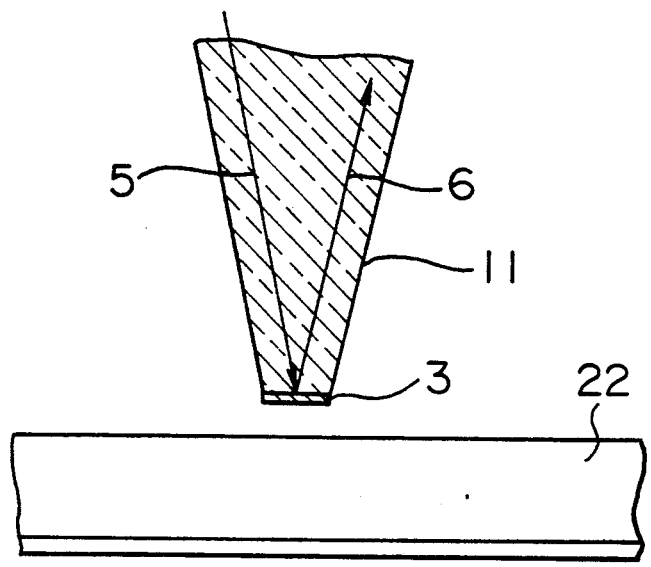
FIG. 20 is a diagram showing an embodiment of the method of detecting the magnetic field from the transition between superconduction and normalconduction by the current.

FIG. 20 shows an embodiment of the method of detecting the magnetic field through the measurement of the output light having optical characteristics varied on the basis of a normalconduction-superconduction transition of a superconductive material. A superconductive film 3 is formed on a transparent holding member 11 by sputtering. An incident light 5 is reflected by the superconductive film 3, and the reflected light 6 is detected. Depending on the presence or absence of the reflected light 6, the superconductive film 3 is determined to be in the normalconduction state or in the superconduction state. As the superconductive film 3 is moved over a magnetic body 22, it immediately makes a normalconduction-superconduction transition in response to the state of magnetization of the magnetic body 22, and the variation is detected through the reflected light 6. This structure is capable of reading out the magnetization state of the magnetic body 22 in a binary (0 or 1) manner.

$YBa_2Cu_3O_{7-\delta}(0<\delta<0.5)$ with a thickness of 50 nm and dimensions of 100 nm by 100 nm is formed on a quartz substrate, and a laser beam with an 830 nm wavelength is incident to it. At 80° K., with the external magnetic field being 10 mT or more, the element is brought to the normalconduction state and the reflected light output falls by 13%. By measuring the variation of the output light, the external magnetic field applied to the superconductive material is detected in a binary manner.

Figure 1:
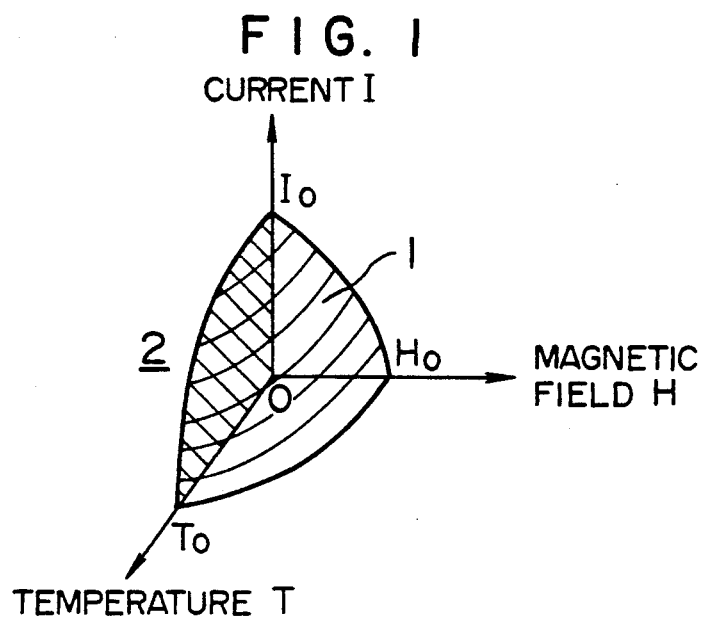
FIG. 1 is a diagram showing the boundaries of the superconduction state and normalconduction state of superconductive material on the coordinates of temperature, magnetic field and current.
Figure 2:
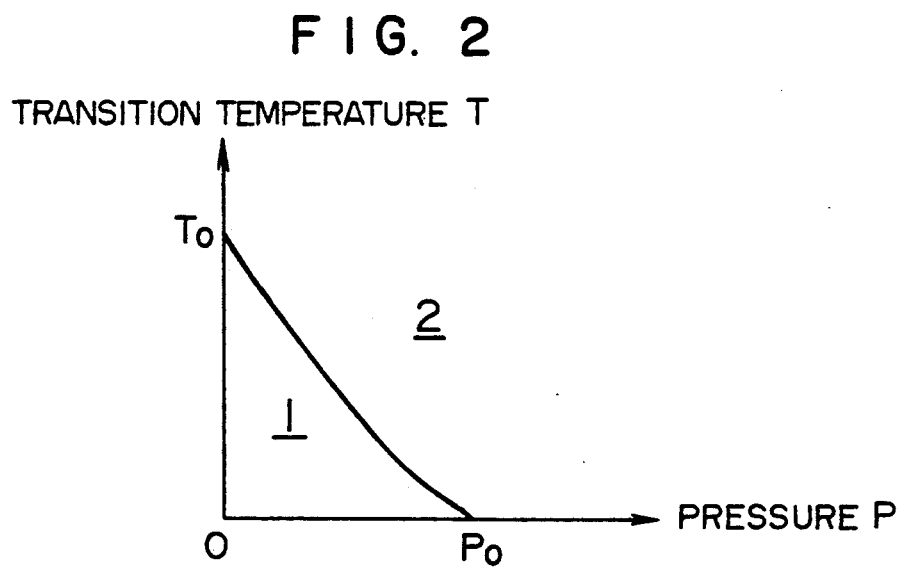
FIG. 2 is a diagram showing the boundry of the superconduction state and normalconduction state of superconductive material on the coordinates of the pressure and temperature.
Figure 3:
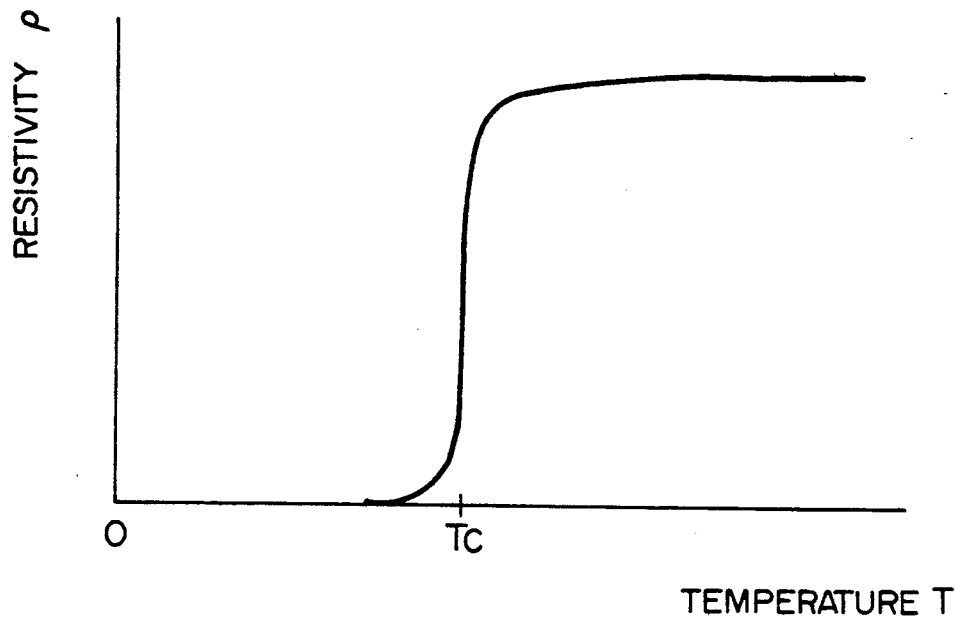
FIG. 3 is a graph showing the p-T characteristics of a type-A superconductive material.
Figure 4:
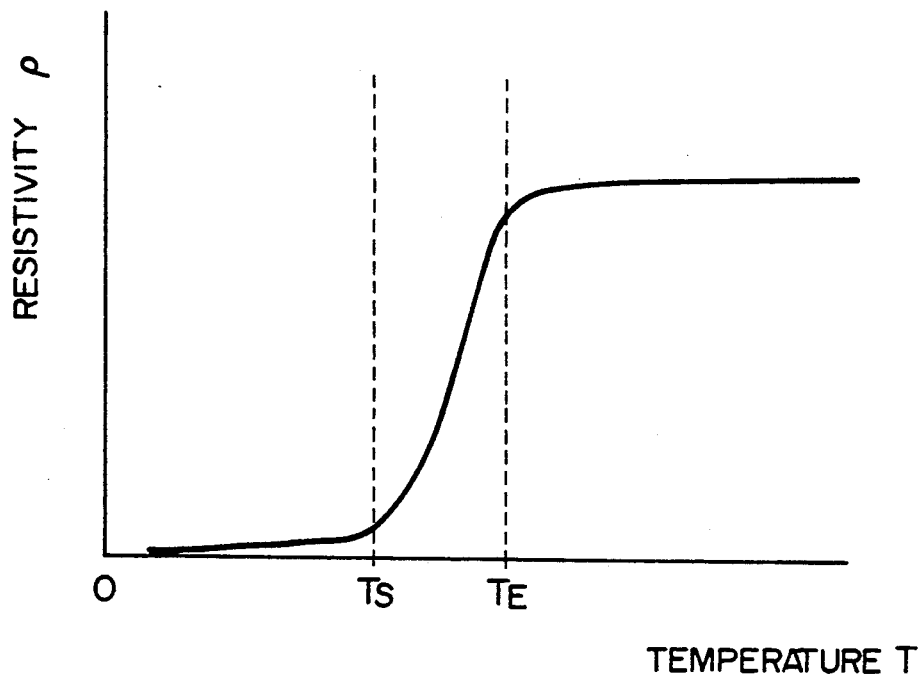
FIG. 4 is a graph showing the p-T characteristics of a type-B superconductive material.
Figure 5:
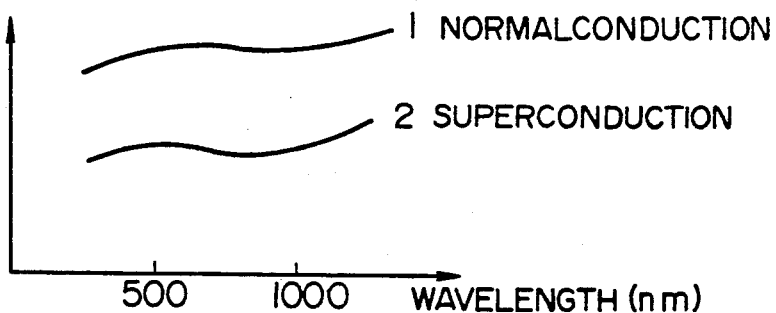
FIG. 5 is a graph showing the transmissivity relative to the wavelength, with superconduction or normalconduction state being a parameter.
Figure 6:
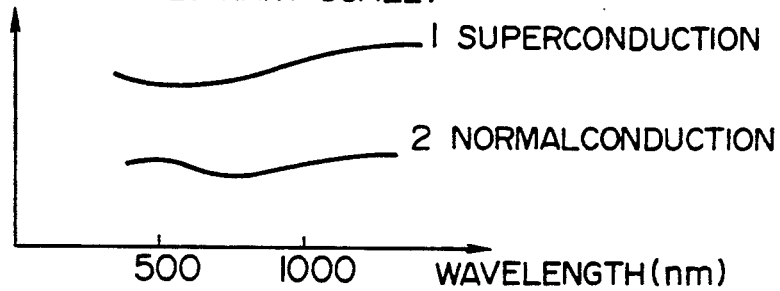
FIG. 6 is a graph showing the reflectivity relative to the wavelength, with superconduction or normalconduction state being a parameter.
Figure 7:
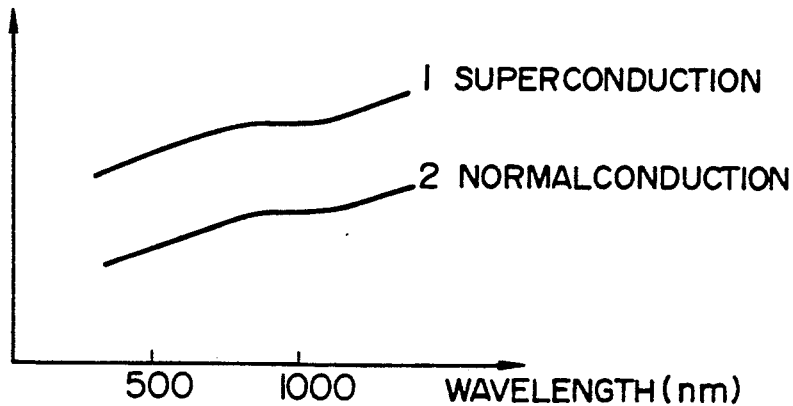
FIG. 7 is a graph showing the refractive index relative to the wavelength, with superconduction or normalconduction state being a parameter.
Figure 8:
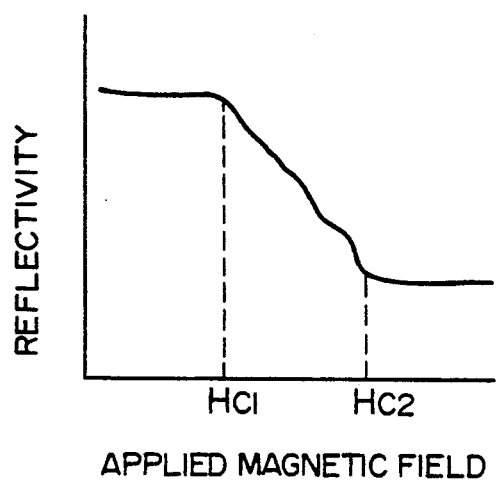
FIG. 8 is a graph showing the reflectivity of a type-B superconductive material relative to the magnetic field.
Figure 9:
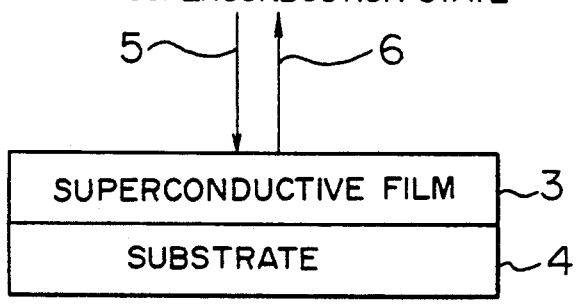
FIGS. 9 and 10 are diagrams showing, as a model, the operation of the optical switch.
Figure 10:
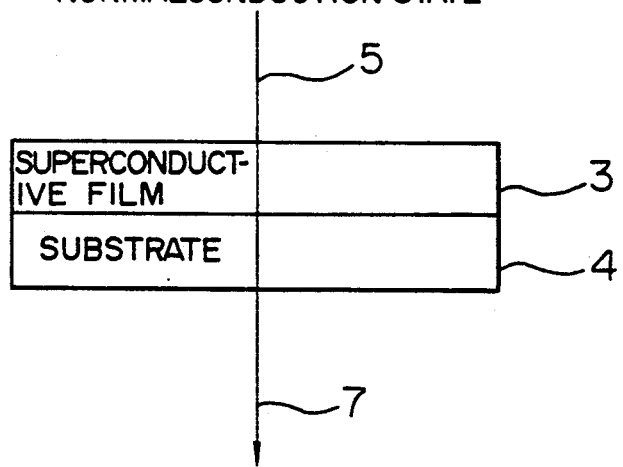
Figure 11:
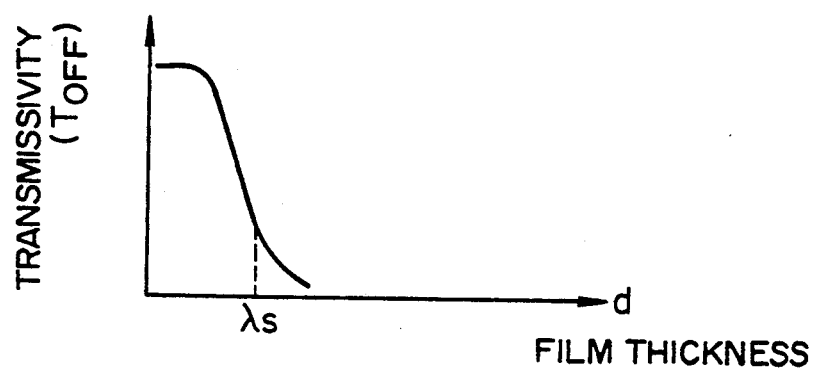
FIGS. 11 and 12 are graphs showing the transmissivity relative to the thickness of superconductive film.
Figure 12:
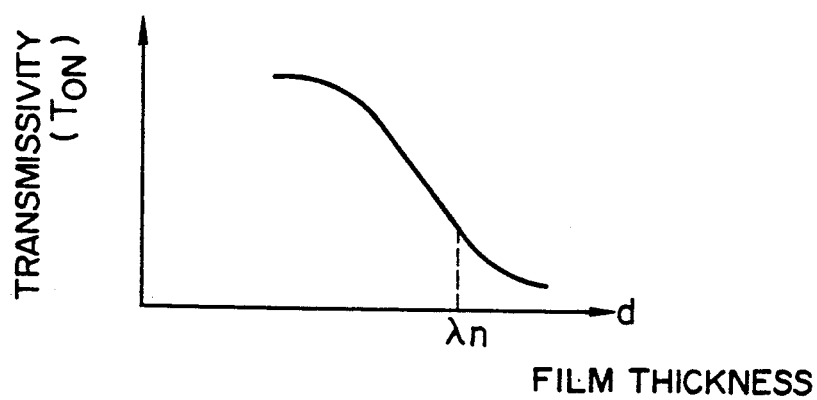
Figure 13:
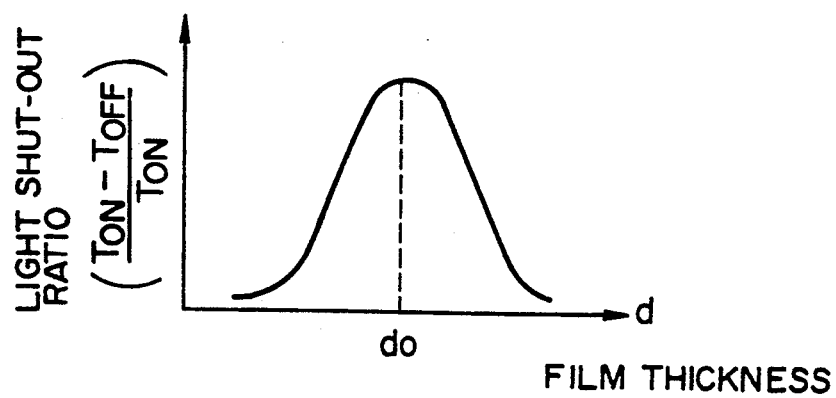
FIG. 13 is a graph showing the light shut-out ratio relative to the thickness of superconductive film.
Figure 21:
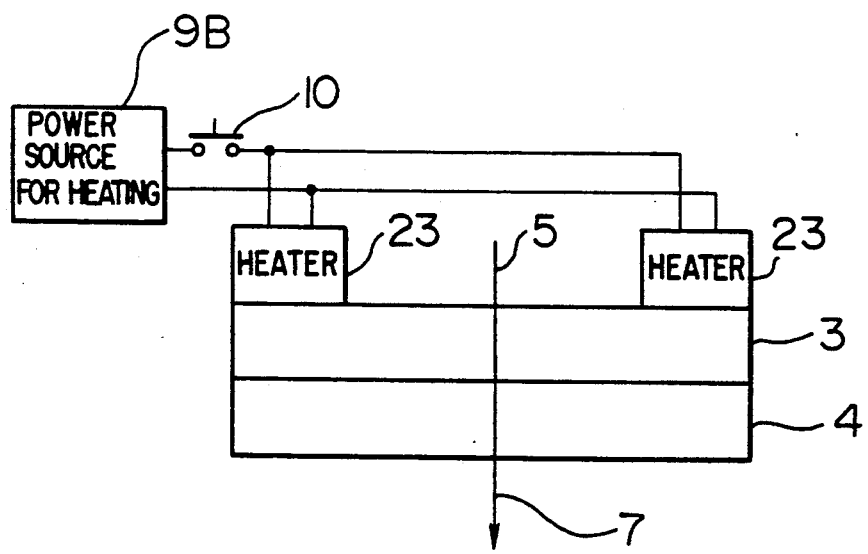
FIG. 21 is a diagram showing an embodiment of the optical switch which is operated by the temperature.

FIG. 21 shows an embodiment of the method of operating the inventive optical switch on the basis of the temperature control. In FIG. 2,, indicated by 3 is a superconductive film, 4 is a substrate, 23 are heaters, 9B is a power source for heating, 10 is a switch, 5 is an incident light, and 7 is a transmitted light. When the switch 10 is closed, the heaters 23 produce heat, and the temperature T of the superconductive film 3 rises. When T has risen above Tc, the superconductive film 3 becomes the normalconduction state and transmits the incident light 5. When the switch 10 is opened, the temperature T of the superconductive film 3 falls, and when T has fallen below Tc the superconductive film 3 returns to the superconduction state and reflects the incident light 5.

A $YBa_2Cu_3O_{7-\delta}(0<\delta<0.5)$ thin film was used to measure the optical switching characteristics. When the film in the superconduction state at 77° K. was heated to 300° K., the transmissivity increased from 4% to 14%. By optimizing the crystal formation, orientation and thickness of the superconductive film, the light shut-out ratio can be improved.

Figure 22:
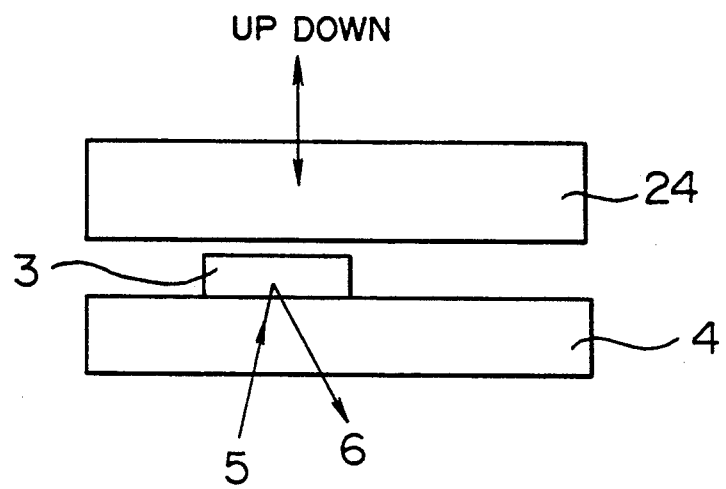
FIGS. 22 and 23 are diagrams showing embodiments of the optical switch which is operated by the pressure.
Figure 23:
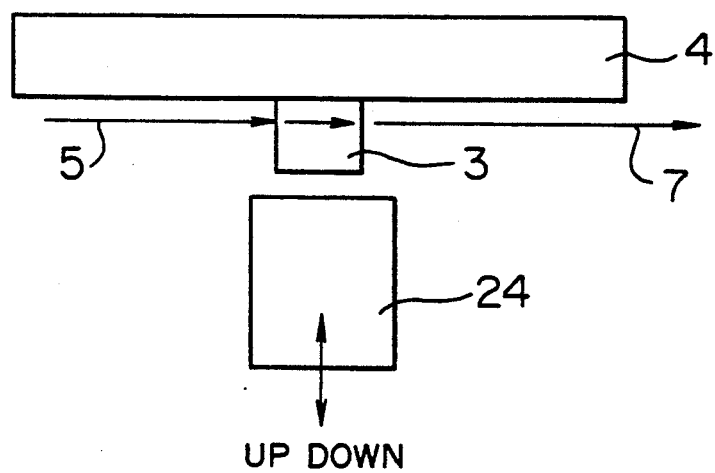

FIG. 22 shows the arrangement for inducing a transition of superconductive material in response to the pressure difference thereby to produce different light outputs due to the reflection. Indicated by 3 is a superconductive material, 4 is a substrate, and 24 is a medium having convex and concave on the surface. The medium 24 is moved up and down so that the pressure applied to the superconductive material 3 varies, thereby inducing a superconduction-normalconduction transition. The resulting variation of reflectivity of the material 3 varies a reflected light 6 derived from an incident light 5, and switching of light is implemented. FIG. 23 is an example of light switching using the variation of transmissivity.

In the embodiment of FIG. 22, a $YBa_2Cu_3O_{7-\delta}(0<\delta<0.5)$ superconductive film 3 was used and a laser beam with an 830 nm wavelength was entered to it at 81° K. which is lower than the critical temperature by 1.2° K. The superconductive film 3 has a thickness of 18 μm, and the substrate 4 is made of quartz. The metallic plate 24 is moved to apply an intermittent pressure of 710 kg/cm² so that a normalconduction-superconduction transition is induced in the superconductive film 3, and a light output variation of 13% is produced.

Figure 24:
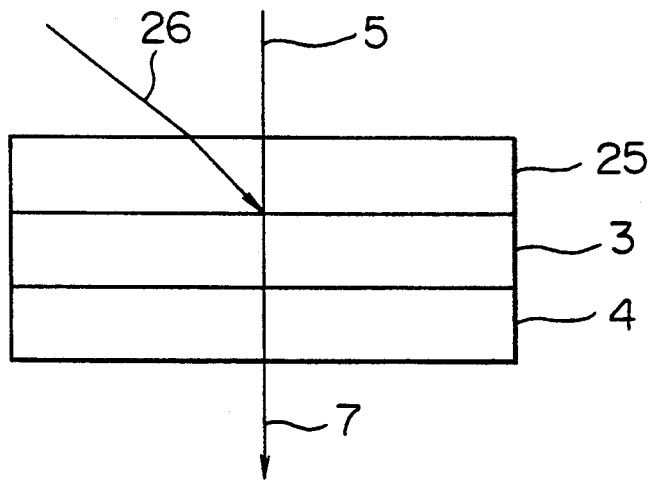
FIGS. 24, 25 and 26 are diagrams showing embodiments of the optical switch which is operated by the light.

FIG. 24 shows an embodiment of the method of operating the inventive optical switch in response to the heat generated by the light. In FIG. 24, indicated by 3 is a superconductive film, 4 is a substrate, 25 is a light absorbing film, 5 is an incident light, 7 is a transmitted light, and 26 is a control light for operating the switch. The light absorbing film 25 does not absorb the incident light 5, but absorbs the control light 26. Specifically, (1) the intensity of the control light 26 is made high enough as compared with the incident light 5, or (2) different wavelengths are used for the incident light and control light. In the arrangement, when the intensity of the control light 26 is varied, the amount of light absorption varies, causing the temperature of the light absorbing film 25 to vary, and consequently the temperature of the superconductive film 3 can be controlled. By controlling the temperature above and below the critical temperature Tc, the operation of optical switch is implemented.

A $YBa_2Cu_3O_{7-\delta}(0<\delta<0.5)$ thin film was used to evaluate the optical switching characteristics. A 1 mW He-Ne laser beam (633 nm) was used for the incident light 5 and a 2.5 W Ar⁺ laser beam (488 nm) was used for the control light 26. At 77° K., the control light 26 was turned on and off, and the transmissivity of the incident light 5 was measured. In response to the irradiation of the control light 26, the transmissivity increased from 6% to 11%. By optimizing the crystal formation, orientation and thickness of the superconductive film and the wavelengths and output levels of the incident light and control light, the light shut-out ratio can be improved.

Figure 25:
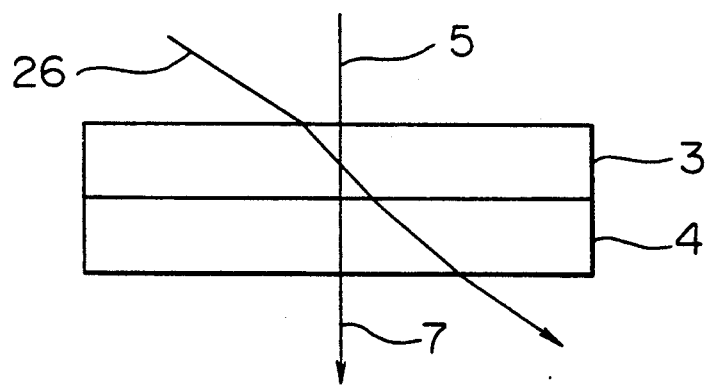
Figure 26:
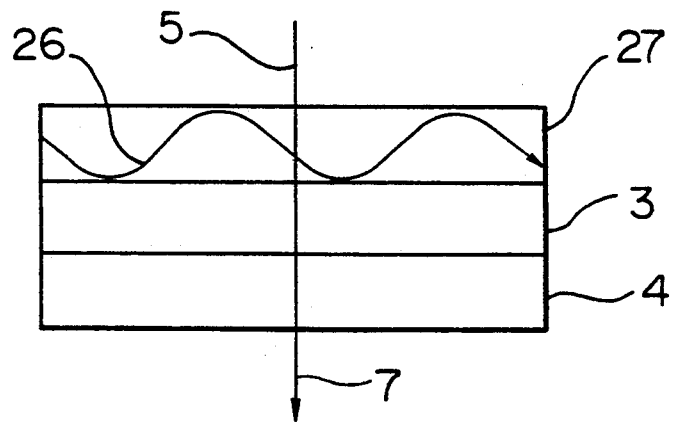

FIGS. 25 and 26 show embodiments of the method of operating the inventive optical switch utilizing that the light is an electromagnetic wave. In the figure, indicated by 3 is a superconductive film, 4 is a substrate, 27 is a waveguide layer, 5 is an incident light, 7 is a transmitted light, and 26 is a control light. Since the light is an electromagnetic wave, the optical switch can be operated using a magnetic field which meets H>Hc. FIG. 25 is the case where the control light 26 is incident aslant separately from the incident light 5. The optical switch operates by modulating the intensity of the control light. FIG. 26 shows an embodiment of the arrangement in which the control light is not incident directly to the superconductive film. The control light 26 goes through a waveguide layer 27 provided adjacent to the superconductive film 3. The electromagnetic field of the control light 26 penetrates into the superconductor 3 to a depth γ expressed as follows.

$$\gamma = k_0\sqrt{N^2 - n^2} \quad (2)$$

where $k_0$ is the wave number of the control light 26 in the vacuum, N is the equivalent refractive index of the waveguide layer 27, and n is the refractive index of the superconductive film 3. By making γ greater than the thickness of the superconductive film 3, the inventive optical switch is operated in response to electromagnetic field of the control light 26. This arrangement enables uniform switching for a wide area.

A $YBa_2Cu_3O_{7-\delta}(0<\delta<0.5)$ thin film was used to measure the optical switching characteristics. The waveguide layer 27 was made of coning #7059 glass (3 μm), and a 0.4 μm SiO₂ buffer layer was formed between it and the superconductive film. An He-Ne laser beam (633 nm; 1 mW) was used for the incident light 5, and an Ar⁺ laser beam (488 nm, 2.5W) was used for the control light 26 by leading it with a prism coupler into the waveguide layer. At 77° K., when the control light 26 was applied, the incident light 5 had its transmissivity increased from 4% to 9%. By optimizing the crystal formation, orientation and thickness of the superconductive film and the thickness of the waveguide layer, the light shut-out ratio can be improved.

When the embodiments shown in FIGS. 24, 25 and 26 are used as optical switches, they necessitate a light source, control system, etc. In the embodiment of FIG. 26, it is possible to change the guided mode by changing the buffer layer between the waveguide layer 27 and superconductive film 3. The principal point of this invention is to induce a transition of superconductive film by using the light as a heat source or using the electromagnetic field of the light in operating the optical switch.

Figure 27:
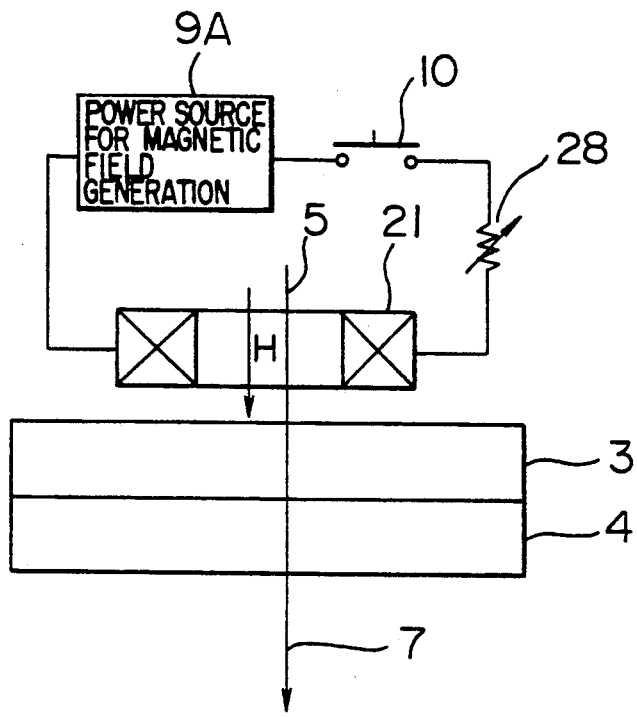
FIG. 27 is a diagram showing an embodiment of the optical switch using a type-B superconductive material operative in response to the magnetic field.

In practical optical switches, the magnetic field, temperature, current, pressure and/or light are controlled continuously so that the superconduction-normalconduction transition of superconductive material takes place continuously, and the resulting continuous change in the optical characteristics can be used. FIG. 27 shows a method of operating an optical modulation element by varying the magnetic field continuously with a variable resistor. In FIG. 27, indicated by 3 is a superconductive film, 4 is a substrate, 21 is a magnetic field generator, 9A is a power source, 10 is a switch, 28 is a variable resistor, 5 is an incident light, and 7 is a transmitted light. When the switch 10 is closed, a current is supplied to the magnetic field generator 21, and a magnetic field H is applied to the superconductive film 3. By adjusting the current supplied to the magnetic field generator 21 with the variable resistor 28, the magnitude of the applied magnetic field H can be varied. According to the foregoing principle of operation, this arrangement carries out the amplitude modulation for the incident light 5.

A $YBa_2Cu_3O_{7-\delta}$ ($0<\delta<0.5$) thin film was used to measure the modulation characteristics. At 77° K., the transmissivity increased progressively from 6% to 9% in response to the applied magnetic field ranging from 8 mT to 11 mT.

Although the embodiment shown in FIG. 27 is the case of operating the optical modulation element solely in response to the magnetic field, it is also possible to combine the magnetic field with the temperature or current. For example, when the critical temperature $T_c$ is incomparably higher than the operating temperature T of the optical modulation element, it becomes possible for the superconductive film to operate with a small magnetic field by being heated to the range of $T_c$. The same effect is achieved when the current supplied to the superconductive film is varied. In case of maintaining a constant external magnetic field, changing the temperature or current varies the critical condition, which is equivalent to a change in the applied magnetic field, and the optical modulation element can be operated in this manner.

Figure 28:
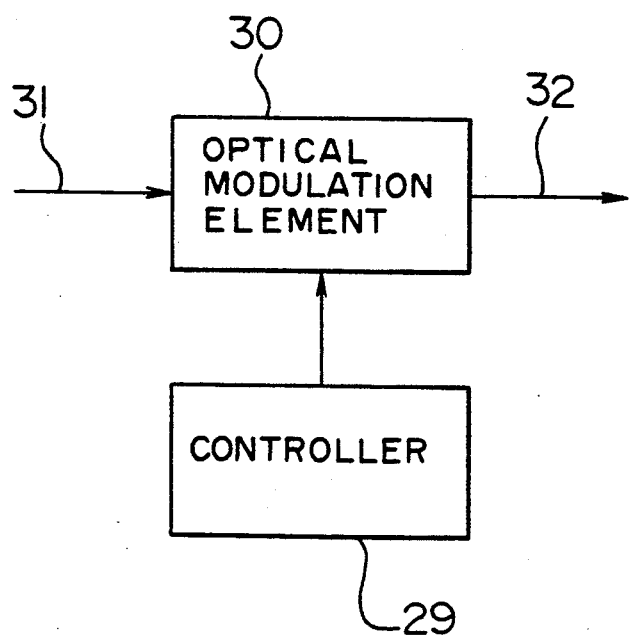
FIG. 28 is a block diagram showing an embodiment of the light attenuator using the inventive optical modulation element.

FIG. 28 is a block diagram of the optical attenuator using the inventive optical modulation element. In FIG. 28, a controller 29 functions to vary the magnetic field strength applied to an optical modulation element 30. For an incident light 31 having an intensity of $I_0$, the intensity I of a transmitted light 32 can be varied continuously in the range of $0 \leq I_{min} \leq I \leq I_{max} \leq I_0$, where $I_{min}$ and $I_{max}$ represent the amounts of transmitted light when the superconductive film in the optical modulation element 30 is in the Meissner state and normalconduction state, respectively.

Figure 29:
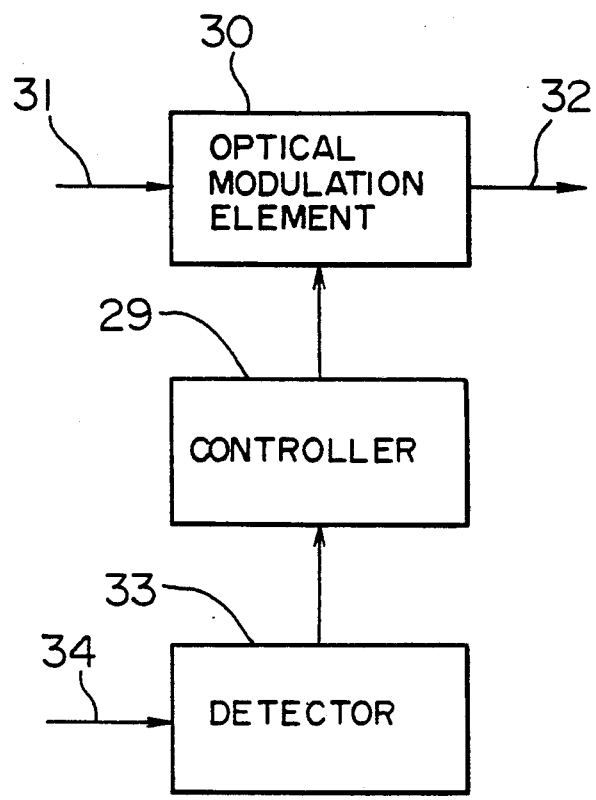
FIG. 29 is a block diagram showing an embodiment of the optical amplifier using the inventive optical modulation element.

FIG. 29 shows an embodiment of the optical amplifier using the inventive optical modulation element. Intensity information of a signal light 34 detected by a detector 33 is entered to a controller 29, and the optical modulation element 30 is operated. Assuming an incident light 31 to have a sufficiently higher intensity than the signal light 34, a transmitted light 32 is an amplified version of the signal light 34. The amplification factor can be set in the controller 29 and in terms of the intensity of the incident light 31. The same arrangement functions as a multiplier through the intensity modulation for the incident light 31. It also functions as a wavelength converter for the incident light 31 and signal light 34 having different wavelengths.

Figure 30:
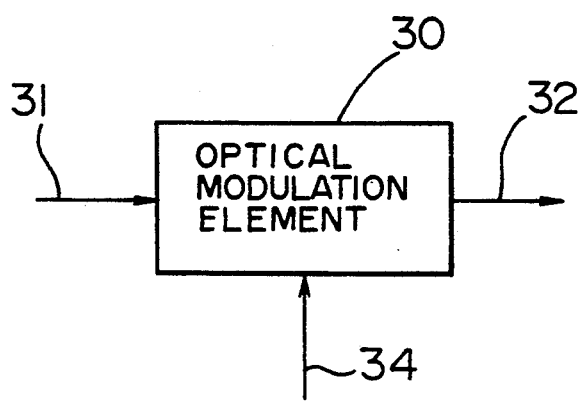
FIG. 30 is a block diagram showing an embodiment of the optical amplifier which is operated directly by the light.

FIG. 30 shows an example of the optical amplifier which directly deals with the light. The optical modulation element 30 used are any of those shown in FIGS. 28 and 29. The function of FIG. 30 is identical to the optical amplifier explained on FIG. 29. The arrangement is expected to be immune to noises and operate fast since it includes no electric circuit system.

The inventive optical modulation element utilizes the state variation of a type-B superconductive material, and when it is assumed to be the variation in optical refractive index, an optical modulation element of a waveguide path type can also be configured.

According to this invention, the response speed of the optical switch is improved and the structure is simplified. Especially, when used as an optical shutter, it is useful for simplifying the structure of writing apparatus such as optical printers. Since the state variation between superconduction and normalconduction is used, the variation of refractive index is great, and it becomes possible to realize optical modulation such as for a high-speed optical switch having a simple structure. Moreover, it becomes possible to serve as sensors for detecting a small magnetic field, current, temperature or pressure for a magnetic reader or the like, while it is simple in structure.

We claim:

1. A method of optical modulation for producing modulated light, said method comprising the steps of:
   applying incident light to a superconductive oxide material having a Tc of at least 30° K., the superconductive oxide material having different optical properties depending upon whether the superconductive oxide material is in a superconductive state or not, and
   applying a signal from an external input device to said superconductive oxide material to induce a superconductive-normalconduction transition in said superconductive oxide material, thereby to change optical properties of the superconductive oxide material.

2. An optical modulation method according to claim 1, wherein said signal from external input means comprises at least one of electric current, magnetic field, temperature, pressure, and light.

3. An optical modulation method according to claim 2, wherein said modulated light comprises light modulated in intensity or light path deflection.

4. An optical modulation method according to claim 1, wherein said modulated light comprises light modulated in intensity.

5. An optical modulation method according to claim 1, wherein said modulated light comprises light modulated in light path deflection.

6. An optical modulation method according to claim 1, wherein the superconductive oxide material is a superconductive oxide material having a $T_c$ greater than 77° K.

7. An optical modulation method according to claim 1, wherein the superconductive oxide material, when in the normalconductive state, is insulative.

8. An optical modulation method according to claim 1, wherein the superconductive oxide material is selected from the group consisting of $(La_{1-x}Sr_x)_2CuO_4$, $(La_{1-x}Ca_x)_2CuO_4$, $(La_{1-x}Ba_x)_2CuO_4$, $La_1Ba_2Cu_3O_7$, $La_{2-x}Na_xCuO_4$, $La_{2-x}CuO_{4-y}$, $La_2Ba_6LuCu_6O_y$, $Y_1Ba_2Cu_3O_7$, $Y_2Ba_4Cu_8O_{20-x}$, $Y_2Ba_4Cu_7O_{15}$, $Bi_2Sr_2Cu_1O_y$, $Bi_2Sr_2Ca_1Cu_2O_y$, $Bi_2Sr_2Ca_2Cu_3O_y$, $Bi_2Sr_2Ca_yCu_4O_y$, $Ba(Pb_{1-x}Bi_x)O_3$, $(Ba_{1-x}K_x)BiO_3$, $(Bi_{1-x}Pb_x)_2Sr_2Ca_2Cu_3O_y$, $Bi_2Sr_{2.6}Nd_{0.4}Cu_2O_y$, $Tl_2Ba_2Cu_1O_y$, $Tl_2Ba_2Ca_1Cu_2O_y$, $Tl_2Ba_2Ca_2Cu_3O_y$, $Tl_1Ba_2CuO_y$, $Tl_1Ba_2Ca_1Cu_2O_y$, $Tl_1Ba_2Ca_2Cu_3O_y$, $Tl_1Ba_2Ca_3Cu_4O_y$, $Tl_1Ba_2Ca_4Cu_5O_y$, $Tl_1Ba_3Ca_2Cu_4O_y$, $Tl_1Sr_2CaCu_3O_y$, $(Tl_{0.5}Pb_{0.5})Sr_2Ca_2Cu_3O_y$, $(Tl_{1-x}K_x)_2Ba_2Ca_2Cu_3O_y$, $(Tl_{0.75}Bi_{0.25})_{1.33}(Sr_{0.5}Ca_{0.5})_{27}Cu_2O$, $Nd_{1.6}Sr_{0.2}Ce_{0.2}CuO_4$, and $Pb_2Sr_2Y_{0.5}Cu_3O_8$, where x and y are $0 \leq x$, $y \leq 1$.

9. An optical modulation method according to claim 1, wherein the superconductive oxide material is a Type-A superconductive material.

10. An optical modulation method according to claim 1, wherein the superconductive oxide material is a Type-B superconductive material.

11. An optical modulation method according to claim 1, wherein an output from said superconductive oxide material, upon said applying incident light, changes upon said applying the signal from external input device.

12. An optical modulation method according to claim 1, wherein upon said applying a signal from external input device the superconductive oxide material changes from a material that reflects the applied incident light to a material that transmits the applied incident light.

13. An optical modulation method according to claim 1, wherein the superconductive oxide material is a film of superconductive oxide material.

14. An optical modulation method according to claim 1, wherein the superconductive oxide material constitutes a component of an optical switch.

15. An optical modulation method according to claim 14, wherein the incident light is applied to the superconductive oxide material along a first path, and when applying said signal from the external input device an output of light from the superconductive oxide material is along a second path different from a path along which the output of light would pass were said signal from the external input device not applied.

16. A method of detecting an external input signal from an external input device using a superconductive oxide material having a $T_c$ of at least 30° K., the superconductive oxide material having different optical properties depending upon whether the superconductive oxide material is in a superconductive state or not, said method comprising the steps of:

applying said signal from said external input device to said superconductive oxide material, to induce a superconduction-normalconduction transition in said superconductive oxide material, to thereby change optical properties of the superconductive oxide material;

applying incident light to said superconductive oxide material; and measuring modulated light outputted from said superconductive oxide material.

17. A method of detecting an external input signal from an external input device according to claim 16, said method further comprising the step of arithmetic processing said modulated light outputted form said superconductive oxide material to detect said external input signal.

18. A signal detecting method according to claim 17, wherein said signal from said external input means comprises any of electric current, magnetic field, temperature, and pressure.

19. A signal detecting method according to claim 17, wherein said modulated light comprises light modulated in intensity or light path deflection.

20. A signal detecting method according to claim 16, wherein the superconductive oxide material is a superconductive oxide material having a $T_c$ greater than 77° K.

21. A signal detecting method according to claim 16, wherein the superconductive oxide material, when in the normalconductive state, is insulative.

22. A signal detecting method according to claim 16, wherein the superconductive oxide material is selected from the group consisting of $(La_{1-x}Sr_x)_2CuO_4$, $(La_{1-x}Ca_x)_2CuO_4$, $(La_{1-x}Ba_x)_2CuO_4$, $La_1Ba_2Cu_3O_7$, $La_{2-x}Na_xCuO_4$, $La_{2-x}CuO_{4-y}$, $La_2Ba_6LuCu_6O_y$, $Y_1Ba_2Cu_3O_7$, $Y_2Ba_4Cu_8O_{20-x}$, $Y_2Ba_4Cu_7O_{15}$, $Bi_2Sr_2Cu_1O_y$, $Bi_2Sr_2Ca_1Cu_2O_y$, $Bi_2Sr_2Ca_2Cu_3O_y$, $Bi_2Sr_2Ca_yCu_4O_y$, $Ba(Pb_{1-x}Bi_x)O_3$, $(Ba_{1-x}K_x)BiO_3$, $(Bi_{1-x}Pb_x)_2Sr_2Ca_2Cu_3O_y$, $Bi_2Sr_{2.6}Nd_{0.4}Cu_2O_y$, $Tl_2Ba_2Cu_1O_y$, $Tl_2Ba_2Ca_1Cu_2O_y$, $Tl_2Ba_2Ca_2Cu_3O_y$, $Tl_1Ba_2CuO_y$, $Tl_1Ba_2Ca_1Cu_2O_y$, $Tl_1Ba_2Ca_2Cu_3O_y$, $Tl_1Ba_2Ca_3Cu_4O_y$, $Tl_1Ba_2Ca_4Cu_5O_y$, $Tl_1Ba_3Ca_2Cu_4O_y$, $Tl_1Sr_2CaCu_3O_y$, $(Tl_{0.5}Pb_{0.5})Sr_2Ca_2Cu_3O_y$, $(Tl_{1-x}K_x)_2Ba_2Ca_2Cu_3O_y$, $(Tl_{0.75}Bi_{0.25})_{1.33}(Sr_{0.5}Ca_{0.5})_{27}Cu_2O$, $Nd_{1.6}Sr_{0.2}Ce_{0.2}CuO_4$, and $Pb_2Sr_2Y_{0.5}Cu_3O_8$, where x and y are $0 \leq x$, $y \leq 1$.

23. An optical modulation apparatus for producing modulated light, said apparatus comprising:

a superconductive oxide material having a $T_c$ of at least 30° K., the superconductive oxide material having different optical properties depending upon whether the superconductive oxide material is in a superconductive state or not;

an external input device which generates a signal to be applied to said superconductive oxide material so that a superconduction-normalconduction transition is induced in said superconductive oxide material; and a light source for generating an incident light to be applied to said superconductive oxide material.

24. An optical modulation apparatus according to claim 23, said apparatus further comprising detection means for detecting said modulated light.

25. An optical modulation apparatus according to claim 23, wherein said external input means generates at least one of an electric current, magnetic field, temperature, pressure, and light.

26. An optical modulation apparatus according to claim 25, wherein said modulated light comprises light modulated in intensity or light path deflection.

27. An optical modulation apparatus according to claim 23, wherein said modulated light comprises light modulated in intensity or light path deflection.

28. An optical modulation apparatus according to claim 23, wherein the superconductive oxide material is a superconductive oxide material having a $T_c$ greater than 77° K.

29. An optical modulation apparatus according to claim 23, wherein the superconductive oxide material, when in the normalconductive state, is insulative.

30. An optical modulation apparatus according to claim 23, wherein the superconductive oxide material is selected from group consisting of $(La_{1-x}Sr_x)_2CuO_4$, $(La_{1-x}Ca_x)_2CuO_4$, $(La_{1-x}Ba_x)_2CuO_4$, $La_1Ba_2Cu_3O_7$, $La_{2-x}Na_xCuO_4$, $La_{2-x}CuO_{4-y}$, $La_2Ba_6LuCu_6O_y$, $Y_1Ba_2Cu_3O_7$, $Y_2Ba_4Cu_8O_{20-x}$, $Y_2Ba_4Cu_7O_{15}$, $Bi_2Sr_2Cu_1O_y$, $Bi_2Sr_2Ca_1Cu_2O_y$, $Bi_2Sr_2Ca_2Cu_3O_y$, $Bi_2Sr_2Ca_yCu_4O_y$, $Ba(Pb_{1-x}Bi_x)O_3$, $(Ba_{1-x}K_x)BiO_3$, $(Bi_{1-x}Pb_x)_2Sr_2Ca_2Cu_3O_y$, $Bi_2Sr_{2.6}Nd_{0.4}Cu_2O_y$, $Tl_2Ba_2Cu_1O_y$, $Tl_2Ba_2Ca_1Cu_2O_y$, $Tl_2Ba_2Ca_2Cu_3O_y$, $Tl_1Ba_2CuO_y$, $Tl_1Ba_2Ca_1Cu_2O_y$, $Tl_2Ba_2Ca_2Cu_3O_y$, $Tl_1Ba_2Ca_3Cu_4O_y$, $Tl_1Ba_2Ca_4Cu_5O_y$, $Tl_1Ba_3Ca_2Cu_4O_y$, $Tl_1Sr_2CaCu_3O_y$, $(Tl_{0.5}Pb_{0.5})Sr_2Ca_2Cu_3O_y$, $(Tl_{1-x}K_x)_2Ba_2Ca_2Cu_3O_y$, $(Tl_{0.75}Bi_{0.25})_{1.33}(Sr_{0.5}Ca_{0.5})_{27}Cu_2O$, $Nd_{1.6}Sr_{0.2}Ce_{0.2}CuO_4$, and $Pb_2Sr_2Y_{0.5}Cu_3O_8$, where x and y are $0 \leq x, y \leq 1$.

31. An optical modulation apparatus according to claim 23, wherein the superconductive oxide material is a film of the superconductive oxide material.

32. An optical modulation apparatus according to claim 31, wherein the film of the superconductive oxide material has a thickness such that a desired variation in reflectivity between when the superconductive material is in a superconductive state and in a normalconductive state is achieved.

33. An optical modulation apparatus according to claim 31, wherein a thickness of the film of superconductive oxide material is substantially a magnetic field penetration depth into the superconducting oxide material.

34. A method of detecting an external input signal from an external input device using a superconductive oxide material having a $T_c$ of at least 30° K., the superconductive oxide material having different optical properties depending upon whether the superconductive oxide material is in a superconductive state or not, said method comprising the steps of:

applying said signal from said external input device to said superconductive oxide material, to induce a superconduction-normalconduction transition in said superconductive oxide material, to thereby change optical properties of said superconductive material;

applying incident light to said superconductive oxide material; and detecting modulated light outputted from said superconductive oxide material.

* * * * *